(12) United States Patent
Carraher et al.

(10) Patent No.: US 9,619,563 B2
(45) Date of Patent: Apr. 11, 2017

(54) SEARCH ENGINE OPTIMIZATION USING PAGE ANCHORS

(75) Inventors: Theodore R. Carraher, Raleigh, NC (US); Jake Palmer, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 659 days.

(21) Appl. No.: 13/490,020

(22) Filed: Jun. 6, 2012

(65) Prior Publication Data

US 2012/0246138 A1    Sep. 27, 2012

Related U.S. Application Data

(63) Continuation of application No. 12/494,051, filed on Jun. 29, 2009, now Pat. No. 8,244,755.

(51) Int. Cl.
*G06F 7/00*    (2006.01)
*G06F 17/30*    (2006.01)
*G06F 15/16*    (2006.01)

(52) U.S. Cl.
CPC .. *G06F 17/30864* (2013.01); *G06F 17/30545* (2013.01)

(58) Field of Classification Search
CPC .............. G06F 17/30545; G06F 17/30864
USPC ................................... 707/770, 706
See application file for complete search history.

(56) References Cited

U.S. PATENT DOCUMENTS

| | | | |
|---|---|---|---|
| 6,286,045 B1 | 9/2001 | Griffiths et al. | |
| 6,487,495 B1* | 11/2002 | Gale et al. | ............... 701/461 |
| 6,857,102 B1 | 2/2005 | Bickmore et al. | |
| 7,233,950 B2 | 6/2007 | Smith, III | |
| 7,337,392 B2 | 2/2008 | Lue | |
| 7,509,305 B2 | 3/2009 | Tozawa et al. | |
| 7,788,245 B1* | 8/2010 | Eddings et al. | ............... 707/705 |
| 2002/0026563 A1 | 2/2002 | Chamberlain et al. | |
| 2002/0091788 A1 | 7/2002 | Chlan et al. | |
| 2002/0103829 A1 | 8/2002 | Manning et al. | |
| 2005/0027702 A1* | 2/2005 | Jensen et al. | ......... 707/999.003 |
| 2005/0251394 A1* | 11/2005 | Carro | ......................... 704/270.1 |
| 2006/0074999 A1 | 4/2006 | Chidlovskii | |
| 2006/0143307 A1 | 6/2006 | Codignotto | |
| 2007/0073704 A1* | 3/2007 | Bowden et al. | ......... 707/999.01 |
| 2007/0130100 A1 | 6/2007 | Miller | |
| 2007/0168465 A1 | 7/2007 | Toppenberg et al. | |
| 2007/0283245 A1 | 12/2007 | Masood | |
| 2009/0094137 A1* | 4/2009 | Toppenberg et al. | ......... 715/234 |
| 2010/0023850 A1 | 1/2010 | Jagdale et al. | |

OTHER PUBLICATIONS

United States Patent and Trademark Office, Office Action for U.S. Appl. No. 12/493,973, Oct. 5, 2011, pp. 1-30, Alexandria, VA, USA.

(Continued)

*Primary Examiner* — Usmaan Saeed
*Assistant Examiner* — Brian E. Weinrich
(74) *Attorney, Agent, or Firm* — Lee Law, PLLC; Christopher B. Lee

(57) ABSTRACT

A web content search request including a search term is received at a searching/indexing device. A web search is performed based upon the search term. A markup language (ML) document returned via the web search including the search term is parsed. A location of the search term within the ML document is identified. A hypertext link to the identified location of the search term within the ML document is configured.

24 Claims, 5 Drawing Sheets

(56) References Cited

OTHER PUBLICATIONS

United States Patent and Trademark Office, Office Action for U.S. Appl. No. 12/493,973, Feb. 7, 2012, pp. 1-30, Alexandria, VA, USA.
United States Patent and Trademark Office, Notice of Allowance for U.S. Appl. No. 12/493,973, Apr. 20, 2012, pp. 1-10, Alexandria, VA, USA.
United States Patent and Trademark Office, Office Action for U.S. Appl. No. 12/494,051, Sep. 28, 2011, pp. 1-24, Alexandria, VA, USA.
United States Patent and Trademark Office, Office Action for U.S. Appl. No. 12/494,051, Feb. 2, 2012, pp. 1-28, Alexandria, VA, USA.
United States Patent and Trademark Office, Notice of Allowance for U.S. Appl. No. 12/494,051, Apr. 9, 2012, pp. 1-13, Alexandria, VA, USA.
Author Unknown, Links in HTML Documents, Website/page, Printed from website on Jun. 11, 2009, pp. 1-12, W3C HTML 4.01 Specification, Published at: http://www.w3.org/TR/html401/struct/links.html.
Author Unknown, Show Anchors 2.1, Website/page, Printed from website on Jun. 11, 2009, pp. 1-3, Add-ons for Firefox, Published at: https://addons.mozilla.org/en-US/firefox/addon/416.
United States Patent and Trademark Office, Office Action for U.S. Appl. No. 13/489,966, Dec. 6, 2012, pp. 1-36, Alexandria, VA, USA.
United States Patent and Trademark Office, Office Action for U.S. Appl. No. 13/489,966, Jun. 20, 2013, pp. 1-34, Alexandria, VA, USA.
United States Patent and Trademark Office, Office Action for U.S. Appl. No. 13/489,966, Oct. 16, 2013, pp. 1-34, Alexandria, VA, USA.
United States Patent and Trademark Office, Notice of Allowance for U.S. Appl. No. 13/489,966, Feb. 27, 2014, pp. 1-10, Alexandria, VA, USA.

* cited by examiner

US 9,619,563 B2

SEARCH ENGINE OPTIMIZATION USING PAGE ANCHORS

RELATED APPLICATIONS

This application is a continuation of and claims priority to and claims the benefit of U.S. patent application Ser. No. 12/494,051 titled "SEARCH ENGINE OPTIMIZATION USING PAGE ANCHORS," which was filed in the United States Patent and Trademark Office on Jun. 29, 2009, which issued as U.S. Pat. No. 8,244,755 on Aug. 14, 2012, and which is incorporated herein by reference in its entirety. This application is further related to U.S. patent application Ser. No. 12/493,973, titled "AUTOMATED CONFIGURATION OF LOCATION-SPECIFIC PAGE ANCHORS," which was filed in the United States Patent and Trademark Office on Jun. 29, 2009, and which issued as U.S. Pat. No. 8,255,787 on Aug. 28, 2012; and is related to concurrently filed U.S. patent application Ser. No. 13/489,966, titled "AUTOMATED CONFIGURATION OF LOCATION-SPECIFIC PAGE ANCHORS," which was filed in the United States Patent and Trademark Office on Jun. 6, 2012, both of which are incorporated herein by reference in their entirety.

BACKGROUND

The present invention relates to systems and methods for search engine optimization. More particularly, the present invention relates to search engine optimization using page anchors.

Search engines index web content for use in response to search requests. When a search request is received, the search engines search the indexed web content for search results that match a search term associated with the search request. The search results may include hypertext links to documents associated with the search results. The documents may be text, images, or other types of documents or files. The search results, including the hypertext links to the documents associated with the search results, are returned in response to the search request.

BRIEF SUMMARY

A method includes receiving, at a searching/indexing device, a web content search request comprising a search term; performing a web search based upon the search term; parsing a markup language (ML) document returned via the web search that comprises the search term; identifying a location of the search term within the ML document; and configuring a hypertext link to the identified location of the search term within the ML document.

A system includes a communication module; and a processor programmed to: receive, at a searching/indexing device via the communication module, a web content search request comprising a search term; perform a web search based upon the search term; parse a markup language (ML) document returned via the web search that comprises the search term; identify a location of the search term within the ML document; and configure a hypertext link to the identified location of the search term within the ML document.

An alternative system includes a communication module; and a processor programmed to: receive, at a searching/indexing device via the communication module, a web content search request comprising a search term; perform a web search based upon the search term; parse a markup language (ML) document returned via the web search that comprises the search term; identify a location of the search term within the ML document; determine that an indexed hypertext link comprising an appended page anchor that references the identified location of the search term within the ML document exists within a search index; retrieve the indexed hypertext link comprising the appended page anchor that references the identified location of the search term within the ML document from the search index; and return the indexed hypertext link in response to the web content search request.

A computer program product includes a computer readable storage medium including a computer readable program. The computer readable program when executed on a computer causes the computer to receive, at a searching/indexing device, a web content search request comprising a search term; perform a web search based upon the search term; parse a markup language (ML) document returned via the web search that comprises the search term; identify a location of the search term within the ML document; and configure a hypertext link to the identified location of the search term within the ML document.

DETAILED DESCRIPTION

Figure 1:
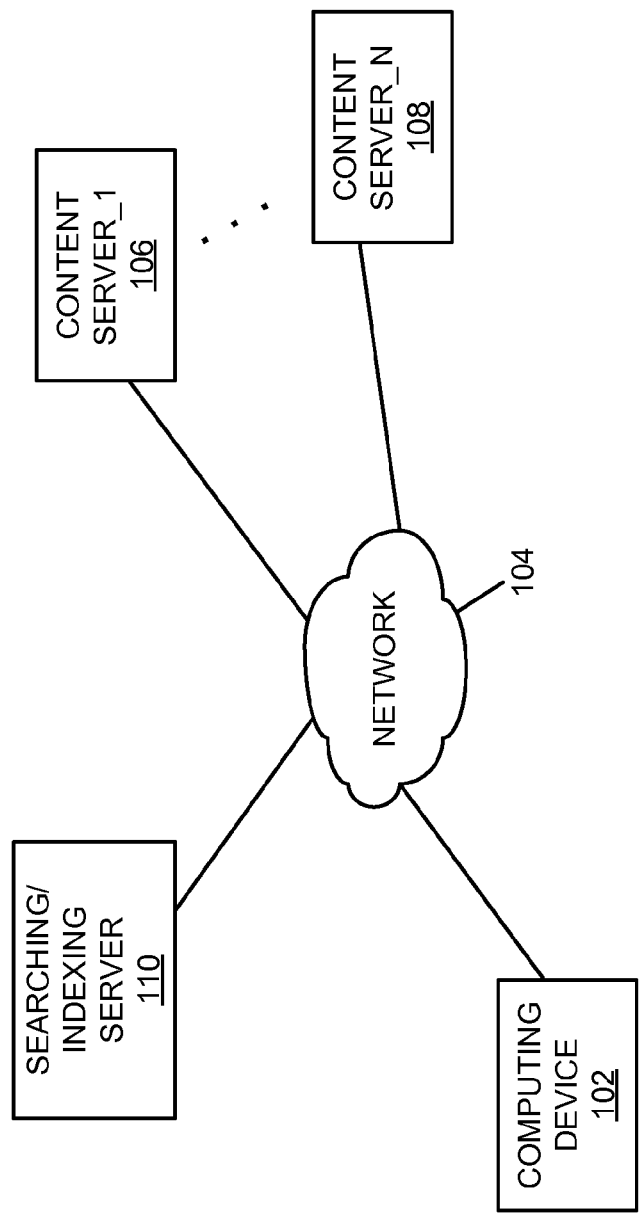
FIG. 1 is a block diagram of an example of an implementation of a system for search engine optimization using page anchors according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides search engine optimization using page anchors. To facilitate optimized searching using page anchors, hypertext links with appended page anchors that reference a location of a search term within searchable markup language (ML) documents are indexed, searched, and returned in response to a search request. If an indexed hypertext link with an appended page anchor for the search term is not found during a search, a hypertext link with an appended existing page anchor for the search term found within the document during the search may be indexed and returned. Alternatively, a hypertext link with an appended direction indicator and a distance offset relative to an existing page anchor found near the search term within the document may be indexed and returned. As another alternative, a page anchor may be inserted into a copy of the resultant document and stored for use in association with future optimized searches and a hypertext link with the inserted page anchor appended may be indexed and returned.

For purposes of the present subject matter, an ML document may include, for example, a hypertext markup language (HTML), an extensible markup language (XML), and a standard generalized markup language (SGML). Many other markup languages exist and all are considered within the scope of the present subject matter.

It is understood that certain documents that may be returned in response to a search may include scanned documents, image-based documents, or other documents that are not directly searchable for text terms. For purposes of the present description, it is assumed that some form of searchable indexed ML document is available or may be created in association with such documents to provide text search capabilities and page anchor indexing for use in association with the present subject matter. As such, within this context, the present subject matter applies to documents of any form that are searchable via such an approach.

Page anchors for use in association with searches for ML documents may be based upon a variety of location-specific page anchors, as described in more detail in the application referenced above and incorporated herein by reference in its entirety. The following introduction provides a few examples of location-specific page anchors. It is understood that many other variations of location-specific page anchors are possible based upon the present description and the incorporated description, and all are considered within the scope of the present subject matter.

As a first example, location-specific page anchors may be created and used for web content search purposes by using markup language tags (e.g., <a name="?"/>). Markup language tags that include attributes with an identifier field (e.g., "id") may also serve as location-specific page anchors (e.g., <div id="?">, <td id="?">). Existing markup language tags within an ML document may be considered and used as existing page anchors for certain processing associated with the present subject matter.

A hypertext link may be configured to include an existing page anchor to an item of web content by appending information to a uniform resource locator (URL) for the ML document, and this hypertext link may be returned in response to a search request and indexed for future searches. For example, when an existing page anchor suitable for use as a location-specific page anchor is found within an ML document in close proximity to the item reference, the existing page anchor may be appended to the URL for the ML document as shown in the following example:

http(s)://server_name/(page_path/)#existing_
anchor_name

Additionally, if a suitable existing page anchor is found relative (e.g., proximate) to a reference to the item of web content within the ML document for which a location-specific page anchor is to be created, yet not in close proximity to the item reference, a direction indicator and a distance offset from the existing page anchor to the item of web content may be determined and appended to the URL along with the existing page anchor. For example, an existing anchor name, a direction indicator (e.g., "up," "down"), and a distance offset (e.g., a number of lines of text, a number of pages of text, a number of renderable elements, etc.) may be appended to the URL as shown in the following example:

http(s)://server_name/(page_path/)#existing_
anchor_name#direction#distance

Similarly, if a suitable existing page anchor is not found proximate to the reference to the item of web content within the ML document (e.g., either no existing page anchor is found or the configured existing page anchor threshold distance relative to the item reference has been exceeded during parsing for existing page anchors), a distance offset from a top of the ML document to the item of web content may be appended to the URL. For example, an existing anchor name and a distance offset may be appended to the URL as shown in the following example:

http(s)://server_name/(page_path/)#distance

Additionally, as described above, a hypertext link may be configured to include a location-specific page anchor to an item of web content by inserting a page anchor into either a copy of the ML document proximate to the reference to the item of web content or into the original content with permission of a content owner, caching the ML document if a copy is used, and appending the inserted page anchor to a URL for the cached ML document. For example, a created location-specific page anchor name inserted into a cached copy of an ML document may be appended to the URL as shown in the following example:

http(s)://caching server_name/(page_path/)#inserted_anchor_name

Each of the examples described above provides a location-specific page anchor in association with a hypertext link to a URL for an ML document for purposes of providing search engine optimization using page anchors in association with the present subject matter. The search engine optimization using page anchors described herein may be performed in real time to allow prompt return of results including page anchors to search terms. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define, are well understood by those skilled in the art.

FIG. 1 is a block diagram of an example of an implementation of a system 100 for search engine optimization using page anchors. Within the system 100, a computing device 102 is illustrated interconnected via a network 104 to a content server_1 106 through a content server_N 108. The computing device 102 is also interconnected via the network 104 to a searching/indexing server 110. It should be noted that the example searching/indexing server 110 is represented as a single device for ease of illustration and description purposes. However, it is understood that the searching/indexing server 110 may be implemented as multiple devices where suitable for a given implementation.

The content server_1 106 through the content server_N 108 provide web content that may be accessed by the computing device 102. As such, the content server_1 106 through the content server_N 108 represent web servers and other content servers for purposes of the present description. The searching/indexing server 110 includes search engine and indexing functionality in response to search requests. The search engine and indexing functionality of the searching/indexing server 110 is based upon page anchors.

As will be described in more detail below in association with FIG. 2 through FIG. 5, the searching/indexing server 110 provides search engine optimization using page anchors based upon determinations of whether indexed hypertext links with appended page anchors that reference a search term are found within an indexed search facility. Additionally, for ML documents that are returned as a portion of a set of search results that are not indexed, the searching/indexing server 110 creates page anchors for return in association with hypertext links to the ML documents in response to the search. The hypertext links with the created page anchors may be indexed for use in association with future searches. The determination to index a given created page anchor may be based upon a variety of factors, such as prominence of the search term in previous searches, prominence of the search term within a given ML document, or any other suitable factor.

Created page anchors may be based upon a suitable existing page anchor proximate to an item reference within a given ML document. If a suitable existing page anchor is identified, a direction indicator and a distance offset are generated. The existing anchor along with the direction indicator and the distance offset are appended to a uniform resource locator (URL) for the ML document and returned, stored, or otherwise distributed in response to the search to provide a hypertext link to the search term within the document. If a suitable existing page anchor is not identified, the searching/indexing server 110 may configure a location-specific page anchor to the item of rendered web content by appending a distance offset from a top of the ML document to the item reference within the ML document to the URL.

As an alternative, the searching/indexing server 110 may make a copy of the ML document returned during the search, insert a location-specific page anchor into the copy of the ML document, and store the copy of the ML document with the inserted location-specific page anchor. The searching/indexing server 110 may then configure a hypertext link as a URL to the stored copy of the ML document with the inserted location-specific page anchor appended. The searching/indexing server 110 may index the configured hypertext link for use in association with future searches. Many other variations of location-specific page anchor configuration are possible and all are considered within the scope of the present subject matter.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose. For example, the network 104 may include a private or public network such as an intranet or the Internet, respectively, direct inter-module interconnection, dial-up, wireless, or any other interconnection mechanism capable of interconnecting the devices with the system 100.

Figure 2:
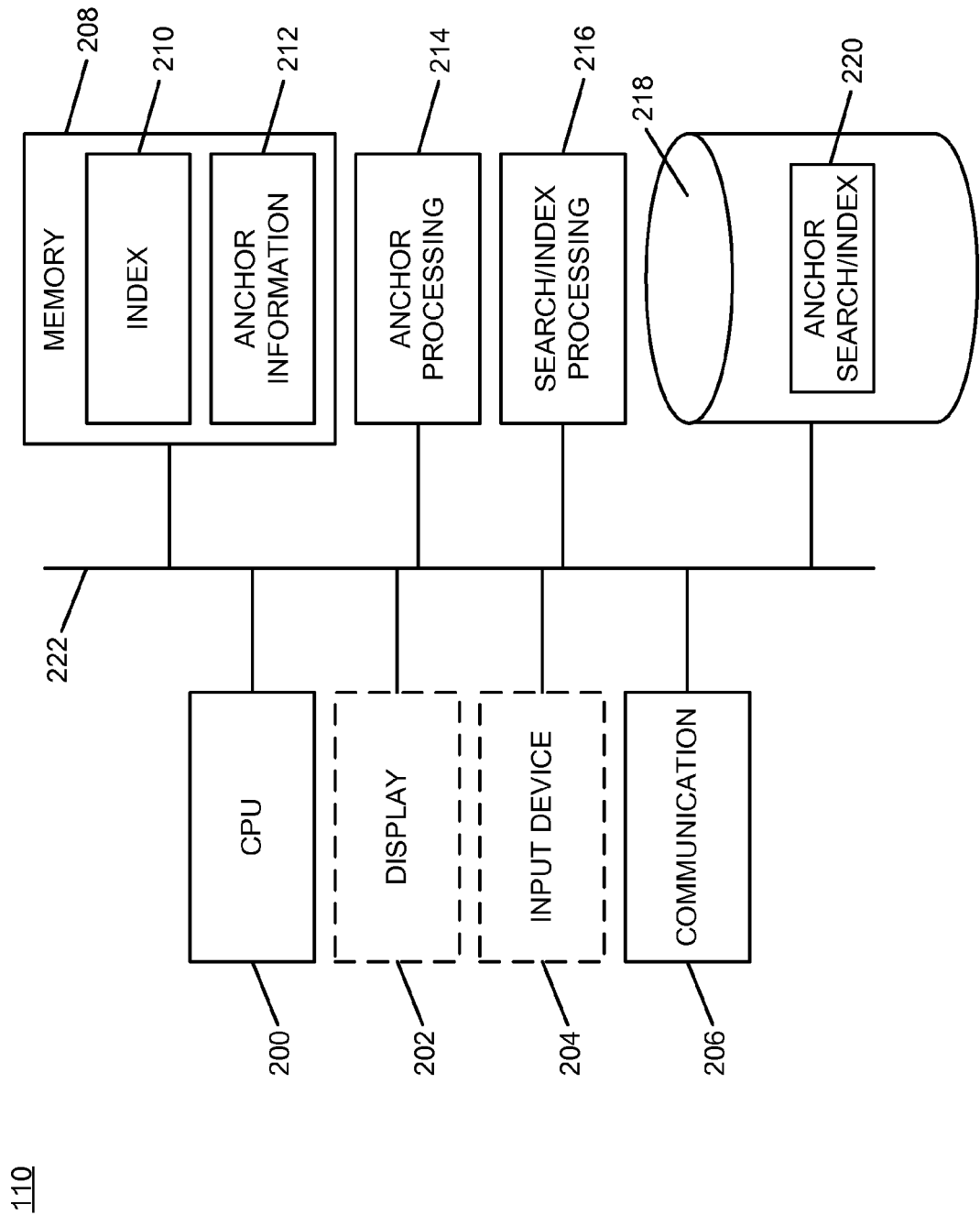
FIG. 2 is a block diagram of an example of an implementation of a searching/indexing server that is capable of performing search engine optimization using page anchors according to an embodiment of the present subject matter.

FIG. 2 is a block diagram of an example of an implementation of the searching/indexing server 110 that is capable of performing search engine optimization using page anchors. A central processing unit (CPU) 200 provides computer instruction execution, computation, and other capabilities within the searching/indexing server 110. A display 202 provides visual information to a user of the searching/indexing server 110 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the searching/indexing server 110 for certain implementations. For example, the searching/indexing server 110 may operate without user interface functionality and be controlled via a user of a remote terminal (not shown). Accordingly, the searching/indexing server 110 may operate as a completely automated embedded device without user configurability or feedback directly at the searching/indexing server 110. However, the searching/indexing server 110 may also provide user feedback and configurability via the display 202 and the input device 204, respectively.

A communication module 206 provides interconnection capabilities that allow the searching/indexing server 110 to communicate with other modules within the system 100, such as the content server_1 106 through the content server_N 108, to search for and retrieve web content for creation of page anchors and for indexing of created page anchors. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes an index storage area 210 and an anchor information storage area 212 that store information used to index and configure, respectively, location-specific page anchors within the searching/indexing server 110. For example, the index storage area 210 may be used to store results during indexed searches for web content associated with a given search term. The anchor information storage area 212 may be used to store information during formation and creation of location-specific page anchors. This information may include presence information for existing anchors, existing anchor location information, direction information relative to either existing anchors or a top or bottom of an ML document used to render a selected item of content, distance offset information, and other information associated with location-specific page anchors. Many other possibilities exist for information storage in association with formation and creation of location-specific page anchors and all are considered within the scope of the present subject matter. As will be described in more detail below, configured location-specific page anchors automate and expedite search actions for identified items of web content, such as providing scrollable links for web content rendering and related processing.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The searching/indexing server 110 also includes an anchor processing module 214 and a search/index processing module 216. The anchor processing module 214 implements the automated configuration of location-specific page anchors for the searching/indexing server 110. The search/index processing module 216 provides search capabilities for the searching/indexing server 110 based upon indexed hypertext links that include page anchors to search terms, and search functionality for searches of the content server_1 106 through the content server_N 108 to search for and retrieve web content for creation of page anchors and for indexing of created page anchors by the anchor processing module 214. Though certain partitioning is suggested by the present example and the examples that follow, it is understood that the respective functions of the anchor processing module 214 and the search/index processing module 216 may be partitioned differently or combined without departure from the scope of the present subject matter.

Though the anchor processing module 214 and the search/index processing module 216 are illustrated as component-level modules for ease of illustration and description purposes, it should be noted that the anchor processing module 214 and the search/index processing module 216 may include any hardware, programmed processor(s), and memory used to carry out the respective functions of these modules as described above and in more detail below. For example, the anchor processing module 214 and the search/index processing module 216 may include additional controller circuitry in the form of application specific integrated circuits (ASICs), processors, and/or discrete integrated circuits and components for performing communication and electrical control activities associated with the respective devices. Additionally, the anchor processing module 214 and the search/index processing module 216 may also include interrupt-level, stack-level, and application-level modules as appropriate. Furthermore, the anchor processing module 214 and the search/index processing module 216 may include any memory components used for storage, execution, and data processing for performing processing activities associated with the respective modules.

It should also be noted that the anchor processing module 214 and the search/index processing module 216 may form a portion of other circuitry described without departure from the scope of the present subject matter. Further, the anchor processing module 214 and the search/index processing module 216 may alternatively be implemented as applications stored within the memory 208. In such an implementation, the anchor processing module 214 and the search/index processing module 216 may include instructions executed by the CPU 200 for performing the functionality described herein. The CPU 200 may execute these instructions to provide the processing capabilities described above and in more detail below for the searching/indexing server 110. The anchor processing module 214 and the search/index processing module 216 may form a portion of an interrupt service routine (ISR), a portion of an operating system, a portion of a browser application, or a portion of a separate application without departure from the scope of the present subject matter.

A database 218 is associated with the searching/indexing server 110 and provides storage capabilities for information associated with the automated configuration of location-specific page anchors of the searching/indexing server 110. The database 218 includes an anchor search/index storage area 220 that may be stored in the form of tables or other arrangements accessible by the searching/indexing server 110. The anchor search/index storage area 220 includes storage for configured location-specific page anchors and hypertext links with location-specific page anchors appended associated with searchable web content as available from one or more of the content server_1 106 through the content server_N 108. It is understood that if multiple location-specific page anchors are configured to similar content, the database 218 may implement compression to conserve storage without departure from the scope of the present subject matter.

The CPU 200, the display 202, the input device 204, the communication module 206, the memory 208, the anchor processing module 214, the search/index processing module 216, and the database 218 are interconnected via an interconnection 222. The interconnection 222 may include a system bus, a network, or any other interconnection capable of providing the respective components with suitable interconnection for the respective purpose.

While the searching/indexing server 110 is illustrated with and has certain components described, other modules and components may be associated with the searching/indexing server 110 without departure from the scope of the present subject matter. Additionally, it should be noted that, while the searching/indexing server 110 is described as a single device for ease of illustration purposes, the components within the searching/indexing server 110 may be co-located or distributed and interconnected via a network without departure from the scope of the present subject matter. For a distributed arrangement, the display 202 and the input device 204 may be located at a control terminal, kiosk, or other location, while the CPU 200 and memory 208 may be located at a local or remote server. Many other possible arrangements for components of the searching/indexing server 110 are possible and all are considered within the scope of the present subject matter. It should also be understood that, though the anchor search/index storage area 220 is shown within the database 218, it may also be stored within the memory 208 without departure from the scope of the present subject matter. Accordingly, the searching/indexing server 110 may take many forms and may be associated with many platforms.

Figure 3:
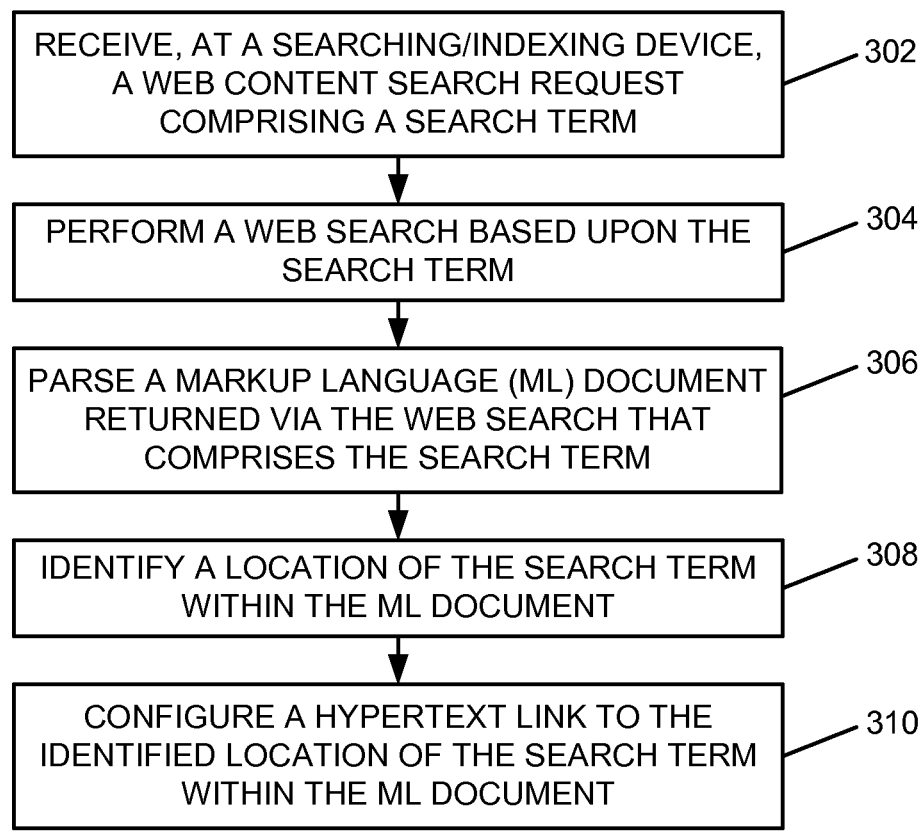
FIG. 3 is a flow chart of an example of an implementation of a process for automated search engine optimization using page anchors according to an embodiment of the present subject matter.
Figure 4:
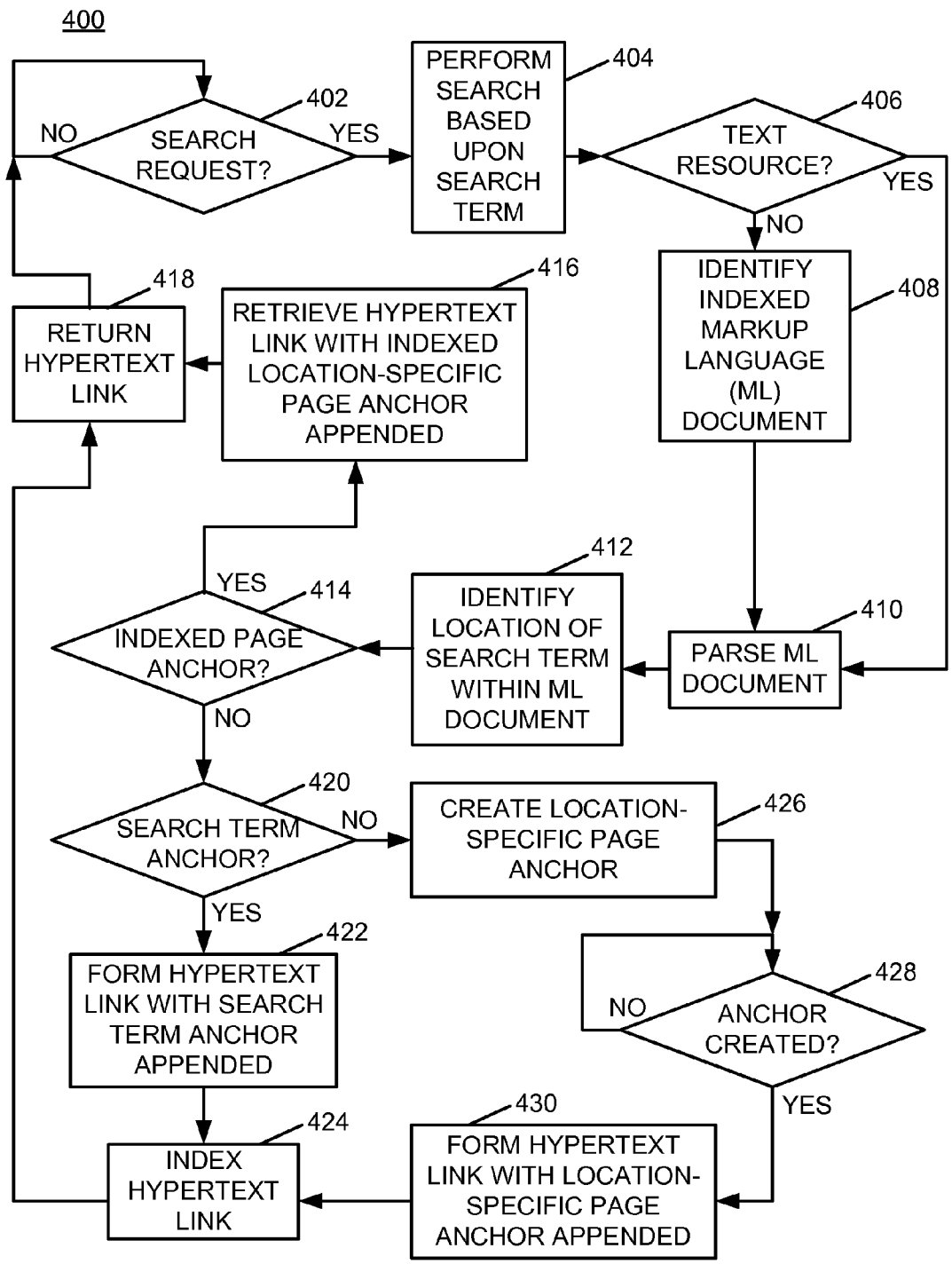
FIG. 4 is a flow chart of an example of an implementation of a process for responding to search requests and performing automated search engine optimization using page anchors according to an embodiment of the present subject matter.
Figure 5:
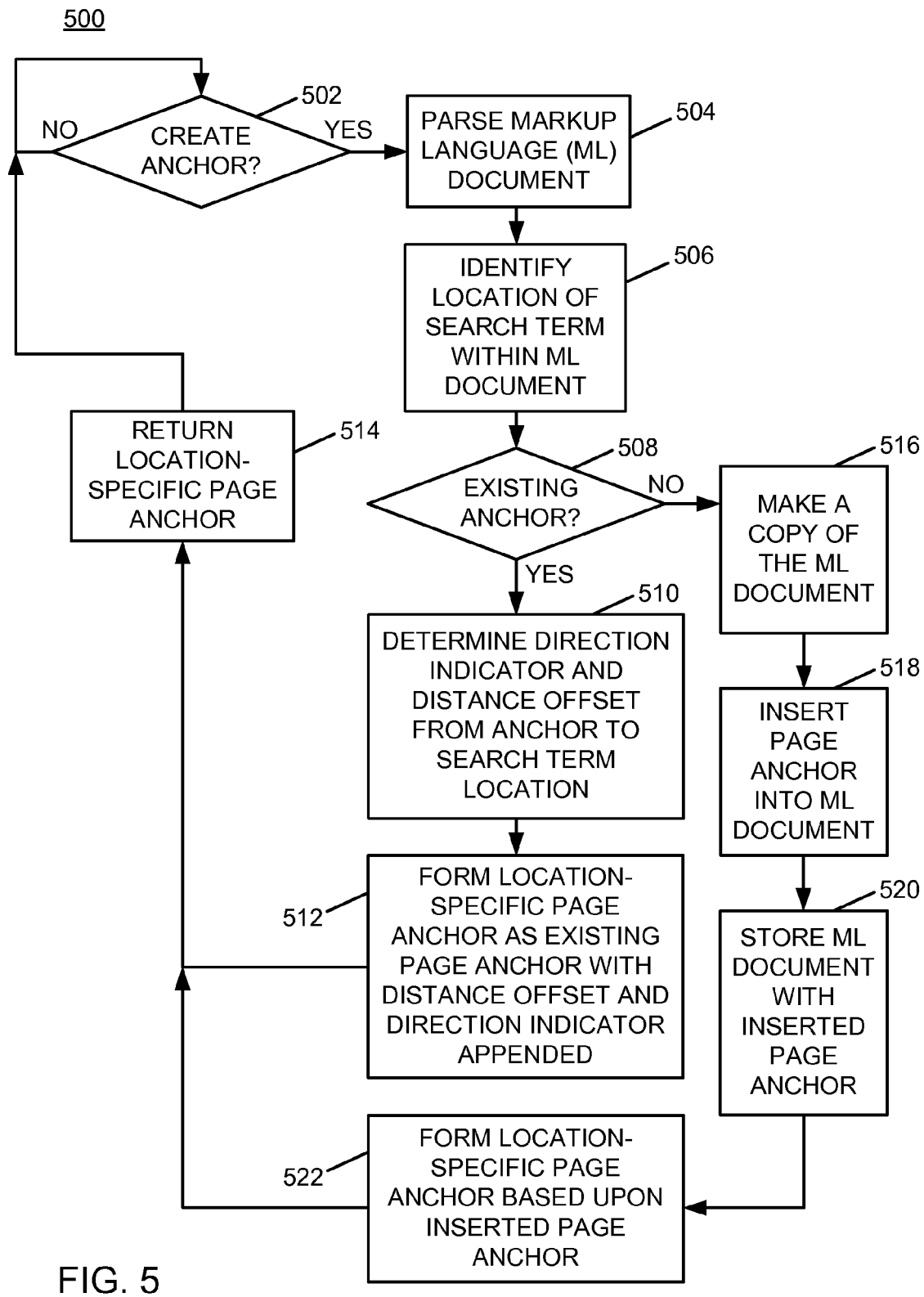
FIG. 5 is a flow chart of an example of an implementation of a process for creating location-specific page anchors for locations of search terms within documents returned in association with search requests, such as in response to requests associated with the processing described in association with FIG. 4 according to an embodiment of the present subject matter.

FIG. 3 through FIG. 5 below describe example processes that may be executed by devices, such as the searching/indexing server 110, to perform the automated search engine optimization using page anchors associated with the present subject matter. Many other variations on the example processes are possible and all are considered within the scope of the present subject matter. The example processes may be performed by modules, such as the anchor processing module 214, the search/index processing module 216, and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter. It is further noted that the example processes described below are represented as discrete processes for ease of illustration purposes. However, it is understood that the example processes described below may be partitioned between components, such as between the anchor processing module 214 and the search/index processing module 216, or otherwise, as appropriate for a given implementation.

FIG. 3 is a flow chart of an example of an implementation of a process 300 for automated search engine optimization using page anchors. At block 302, the process 300 receives, at a searching/indexing device, a web content search request comprising a search term. At block 304, the process 300 performs a web search based upon the search term. At block 306, the process 300 parses a markup language (ML) document returned via the web search that comprises the search term. At block 308, the process 300 identifies a location of the search term within the ML document. At block 310, the process 300 configures a hypertext link to the identified location of the search term within the ML document.

FIG. 4 is a flow chart of an example of an implementation of a process 400 for responding to search requests and performing automated search engine optimization using page anchors. At decision point 402, the process 400 waits for a search request to be received. When a determination is made that a search request has been received, the process 400 performs a search based upon a search term associated with the search request at block 404. The search performed may include a search for web content provided by the content server_1 106 through the content server_N 108. Further, the search may include searching indexed records of available web content or any other suitable search mechanism for performing web-based searches for content.

It should be noted that processing within the process 400 as illustrated represents a single sequence of processing. However, it is understood that the stages of processing described apply for each item returned from the search. Further, the stages of processing described may be performed sequentially, concurrently, in parallel, or by any approach suitable for a given implementation to process each search result returned. Additionally, as discussed above, certain documents that may be returned in response to a search may include scanned documents, image-based documents, or other documents that are not directly searchable for text terms. For purposes of the present description, it is assumed that some form of searchable indexed ML document is available or may be created in association with such documents to provide text search capabilities and page anchor indexing for use in association with the present subject matter.

At decision point 406, the process 400 determines, for each search result item returned, whether each returned search result item is a searchable text resource, such as a markup language (ML) web content document. For ease of description purposes, processing for a single returned search item is described below, though as described above, the processing described below may be performed for each search result item returned.

When a determination is made at decision point 406 that the respective search result item is not a searchable text resource, the process 400 identifies a respective indexed ML document associated with the respective search result item that may be parsed for search results at block 408. Upon identifying the respective ML document associated with the search result item or upon determining that the respective search result item is a searchable text resource, the process 400 parses the respective ML document at block 410. At block 412, the process 400 identifies a location of the search term within the respective ML document.

It should be noted that, for a given search term, multiple locations of the search term may be identified within a given ML document. In such a situation, as described in more detail below, a preferred location may be identified. This additional processing is not shown within FIG. 4 for ease of illustration purposes. However, it is understood that any such processing is within the scope of the present subject matter.

For example, a given search term may be mentioned within an abstract of an ML document, and discussed extensively within a given section or paragraph of the ML document. In such a situation, the location of the section or paragraph, or the location of the first occurrence of the search term within the respective section or paragraph, may be identified as the preferred location for the search term within the ML document. The process 400 may select a single location from multiple identified locations using any suitable algorithm. This additional processing to identify a preferred location for the search term may include statistical, Bayesian, natural language, and other suitable form of analysis. Further, the multiple locations may be scored and/or ranked. If multiple high scoring locations are identified, a location for the search term may be identified proximate to one of the multiple locations, central within the ML document relative to the multiple locations, at a first of the high scoring locations, or separate locations may be identified without departure from the scope of the present subject matter.

At decision point 414, the process 400 determines whether an indexed hypertext link including an appended page anchor that references the location of the search term within the ML document exists within a search index. The process 400 may make this determination by searching the anchor/search index storage area 220 within the database 218 for an indexed hypertext link with an appended page anchor to the location of the search term within the respective ML document.

When a determination is made at decision point 414 that an indexed hypertext link including an appended location-specific page anchor that references the location of the search term within the ML document exists within the search index, the process 400 retrieves the hypertext link with the appended location-specific page anchor from the search index at block 416. At block 418, the process 400 returns the hypertext link with the appended location-specific page anchor and returns to decision point 402 to await a new search request.

When a determination is made at decision point 414 that an indexed hypertext link including an appended page anchor that references the location of the search term within the ML document does not exist within the search index, the process 400 determines whether the respective ML document includes an existing page anchor associated with the search term at decision point 420.

When a determination is made at decision point 420 that an existing page anchor associated with the search term is found within the respective ML document, the process 400 forms a hypertext link as a uniform resource locator (URL) to the respective ML document and appends the existing page anchor associated with the search term to the URL at block 422. At block 424, the process 400 indexes the formed hypertext link with the appended existing page anchor associated with the search term within the search index, such as the anchor/search index storage area 220 within the database 218 for use in future searches. The process 400 continues to block 418, returns the hypertext link with the appended location-specific page anchor, and returns to decision point 402 to await a new search request.

When a determination is made at decision point 420 that an existing page anchor associated with the search term is not found within the respective ML document, the process 400 creates a location-specific page anchor for the search term within the respective ML document at block 426. The process 400 may begin activities to create the location-specific page anchor for the search term within the respective ML document. The process 400 waits at decision point 428 for the process of creating the location-specific page anchor for the search term within the respective ML document to be completed.

Example processing for creation of a location-specific page anchor for the search term within the respective ML document is depicted and described below in association with the description of FIG. 5. The processing for creation of a location-specific page anchor for the search term within the respective ML document is described as a separate process to illustrate that this processing may be performed either by the same module that performs the process 400, such as the search/index processing module 216, or by a separate module, such as the anchor processing module 214. Further, the processing described in association with FIG. 5 may be invoked at the request of the search/index processing module 216 via suitable communication between the two components. For purposes of the present description, it will be assumed that the search/index processing module 216 issued a request to the anchor processing module 214 to create the location-specific page anchor for the search term within the respective ML document. However, description of the processing to create the location-specific page anchor for the search term within the respective ML document will be deferred until the description of FIG. 5 below.

When a determination is made at decision point 428 that the requested location-specific page anchor has been created and returned, the process 400 forms a hypertext link as a URL to the respective ML document and appends the created location-specific page anchor associated with the search term to the URL at block 430. The process 400 indexes the formed hypertext link with the appended created location-specific page anchor associated with the search term within the search index at block 424, returns the hypertext link with the appended location-specific page anchor at block 418, and returns to decision point 402 to await a new search request.

As such, the process 400 provides one example of processing for responding to search requests and performing automated search engine optimization using page anchors. Many other processes for responding to search requests and performing automated search engine optimization using page anchors are possible and all are considered within the scope of the present subject matter.

FIG. 5 is a flow chart of an example of an implementation of a process 500 for creating location-specific page anchors for locations of search terms within documents returned in association with search requests, such as in response to requests associated with the processing described above in association with FIG. 4. At decision point 502, the process 500 waits for a request to create a location-specific page anchor to be received. When a determination is made that a request to create a location-specific page anchor has been received, the process 500 parses an ML document associated with the request at block 504. At block 506, the process 500 identifies a location of the search term within the ML document.

At decision point 508, the process 500 makes a determination as to whether the ML document includes an existing page anchor proximate to a location associated with the search term within the ML document. For example, an existing page anchor to another item of renderable content within the ML document may be used as a reference to create a location-specific page anchor based upon the present subject matter. Additionally, the search term may be proximate to the top of the ML document, in which case, the top of the ML document may be used as a reference for creation of a location-specific page anchor.

When a determination is made at decision point 508 that the ML document includes an existing page anchor proximate to a location associated with the search term within the ML document, or that the search term is proximate to the top of the ML document such that the top of the ML document may be used as a reference for creation of a location-specific page anchor, the process 500 determines a direction indicator and a distance offset from the existing page anchor or the top of the ML document to the search term location within the ML document at block 510.

At block 512, the process 500 forms a hypertext link as a URL for the ML document and appends the existing page anchor, the distance offset, and the direction indicator to the URL. Alternatively, if the top of the ML document is used as the existing page anchor, the process 500 may append only the distance offset to the URL for the ML document. At block 514, the process 500 returns the created location-specific page anchor to the location of the search term and returns to decision point 502 to await another request for creation of a location specific page anchor. It is additionally noted, that if the request to create the location specific page anchor is generated by a process other than the process of FIG. 4 described above that indexes created location specific page anchors, the process 500 may also index the created location specific page anchor in association with the processing at block 514.

Returning to the description of decision point 508, the when a determination is made at decision point 508 that the ML document does not include an existing page anchor proximate to a location associated with the search term within the ML document, or that the search term is not proximate to the top of the ML document such that the top of the ML document may be used as a reference for creation of a location-specific page anchor, the process 500 makes a copy of the ML document at block 516. At block 518, the process 500 inserts a page anchor into the copy of the ML document at the location associated with the search term. At block 520, the process 500 stores the copy of the ML document including the inserted page anchor. It should be noted that the copy of the ML document including the inserted page anchor may be stored within the anchor search/index storage area 220 of the database 218 for use during future search requests by the searching/indexing server 110. The copy of the ML document including the inserted page anchor may also be stored in a portion of the memory 208 in the form of cache memory without departure from the scope of the present subject matter. In such an implementation, the searching/indexing server 110 may also serve as a cache server for the content server_1 106 through the content server_N 108. Upon storage of the copy of the ML document including the inserted page anchor, the process 500 forms a hypertext link as a URL to the stored copy of the ML document and appends the inserted page anchor to the URL at block 522. The process 500 returns the created location-specific page anchor to the location of the search term at block 514 and returns to decision point 502 to await another request for creation of a location specific page anchor. As described above, the process 500 may also index the created location specific page anchor in association with the processing at block 514.

As such, the process 500 provides one example of processing for creating location-specific page anchors for locations of search terms within documents returned in association with search requests. Many other processes for creation of location-specific page anchors for locations of search terms within documents returned in association with search requests are possible and all are considered within the scope of the present subject matter.

As described above in association with FIG. 1 through FIG. 5, the example systems and processes provide automated search engine optimization using page anchors. Many other variations and additional activities associated with search engine optimization using page anchors are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, at a searching/indexing device, a web content search request comprising a search term;
    performing a web search based upon the search term;
    parsing a markup language (ML) document returned via the web search that comprises the search term;
    identifying a location of the search term within the ML document; and
    configuring a hypertext link that causes, when selected, a return to the ML document and a return to the location of the search term within the ML document, where:
        the configured hypertext link comprises a uniform resource locator (URL) to the ML document with an appended page anchor that comprises a text identifier of a markup language tag located within the ML document proximate to the location of the search term within the ML document.

2. The method of claim 1, further comprising:
    determining whether an indexed hypertext link comprising the appended page anchor exists within a search index; and
    where configuring the hypertext link that causes, when selected, the return to the ML document and the return to the location of the search term within the ML document comprises configuring the hypertext link based upon the determination of whether the indexed hypertext link comprising the appended page anchor exists within the search index.

3. The method of claim 2, where, in response to determining that the indexed hypertext link comprising the appended page anchor exists within the search index, configuring the hypertext link based upon the determination of whether the indexed hypertext link comprising the appended page anchor exists within the search index comprises retrieving the hypertext link with the appended page anchor from the search index.

4. The method of claim 1, further comprising determining whether the ML document comprises an existing page anchor associated with the search term.

5. The method of claim 4, where, in response to determining that the ML document comprises the existing page anchor associated with the search term, configuring the hypertext link that causes, when selected, the return to the ML document and the return to the location of the search term within the ML document comprises:

forming the hypertext link as the URL to the ML document;

appending the existing page anchor associated with the search term to the URL; and indexing the formed hypertext link with the appended existing page anchor associated with the search term within a search index.

6. The method of claim 4, further comprising, in response to determining that the ML document does not comprise the existing page anchor associated with the search term, determining whether the ML document comprises an existing page anchor associated with another portion of content proximate to a location associated with the search term within the ML document.

7. The method of claim 1, where identifying the location of the search term within the ML document comprises:

identifying a plurality of locations of the search term within the ML document;

determining a preferred location for the search term from the plurality of locations of the search term within the ML document; and selecting the preferred location for the search term as the identified location.

8. The method of claim 1, where the searching/indexing device is distributed across a plurality of devices.

9. A system, comprising:

a communication module; and a processor programmed to:

receive, at a searching/indexing device via the communication module, a web content search request comprising a search term;

perform a web search based upon the search term;

parse a markup language (ML) document returned via the web search that comprises the search term;

identify a location of the search term within the ML document; and configure a hypertext link that causes, when selected, a return to the ML document and a return to the location of the search term within the ML document, where:

the configured hypertext link comprises a uniform resource locator (URL) to the ML document with an appended page anchor that comprises a text identifier of a markup language tag located within the ML document proximate to the location of the search term within the ML document.

10. The system of claim 9, further comprising a search index that stores hypertext links, and where the processor is further programmed to:

determine whether an indexed hypertext link comprising the appended page anchor exists within the search index; and where, in being programmed to configure the hypertext link that causes, when selected, the return to the ML document and the return to the location of the search term within the ML document, the processor is programmed to configure the hypertext link based upon the determination of whether the indexed hypertext link comprising the appended page anchor exists within the search index.

11. The system of claim 10, where, in response to determining that the indexed hypertext link comprising the appended page anchor exists within the search index, the processor, in being programmed to configure the hypertext link based upon the determination of whether the indexed hypertext link comprising the appended page anchor exists within the search index, is programmed to retrieve the hypertext link with the appended page anchor from the search index.

12. The system of claim 9, where the processor is further programmed to determine whether the ML document comprises an existing page anchor associated with the search term.

13. The system of claim 12, where, in response to determining that the ML document comprises the existing page anchor associated with the search term, the processor, in being programmed to configure the hypertext link that causes, when selected, the return to the ML document and the return to the location of the search term within the ML document, is programmed to:

form the hypertext link as the URL to the ML document;

append the existing page anchor associated with the search term to the URL; and index the formed hypertext link with the appended existing page anchor associated with the search term within a search index.

14. The system of claim 12, where the processor is further programmed to, in response to determining that the ML document does not comprise the existing page anchor associated with the search term, determine whether the ML document comprises an existing page anchor associated with another portion of content proximate to a location associated with the search term within the ML document.

15. The system of claim 9, where, in being programmed to identify the location of the search term within the ML document, the processor is programmed to:

identify a plurality of locations of the search term within the ML document;

determine a preferred location for the search term from the plurality of locations of the search term within the ML document; and select the preferred location for the search term as the identified location.

16. The system of claim 9, where the searching/indexing device is distributed across a plurality of devices and the processor comprises a plurality of processors.

17. A computer program product comprising a computer readable storage device including a computer readable program, wherein the computer readable program when executed on a computer causes the computer to:

receive, at a searching/indexing device, a web content search request comprising a search term;

perform a web search based upon the search term;

parse a markup language (ML) document returned via the web search that comprises the search term;

identify a location of the search term within the ML document; and configure a hypertext link that causes, when selected, a return to the ML document and a return to the location of the search term within the ML document, where:

the configured hypertext link comprises a uniform resource locator (URL) to the ML document with an appended page anchor that comprises a text identifier of a markup language tag located within the ML document proximate to the location of the search term within the ML document.

18. The computer program product of claim 17, where the computer readable program when executed on the computer further causes the computer to:

determine whether an indexed hypertext link comprising the appended page anchor exists within a search index; and where, in causing the computer to configure the hypertext link that causes, when selected, the return to the ML document and the return to the location of the search term within the ML document, the computer readable program when executed on the computer causes the computer to configure the hypertext link based upon the determination of whether the indexed hypertext link comprising the appended page anchor exists within the search index.

19. The computer program product of claim 18, where, in response to determining that the indexed hypertext link comprising the appended page anchor exists within the search index, the computer readable program, in causing the computer to configure the hypertext link based upon the determination of whether the indexed hypertext link comprising the appended page anchor exists within the search index, when executed on the computer causes the computer to retrieve the hypertext link with the appended page anchor from the search index.

20. The computer program product of claim 17, where the computer readable program when executed on the computer further causes the computer to determine whether the ML document comprises an existing page anchor associated with the search term.

21. The computer program product of claim 20, where, in response to determining that the ML document comprises the existing page anchor associated with the search term, the computer readable program, in causing the computer to configure the hypertext link that causes, when selected, the return to the ML document and the return to the location of the search term within the ML document, when executed on the computer causes the computer to:
form the hypertext link as the URL to the ML document;
append the existing page anchor associated with the search term to the URL; and
index the formed hypertext link with the appended existing page anchor associated with the search term within a search index.

22. The computer program product of claim 20, where the computer readable program when executed on the computer further causes the computer to:
determine that the ML document does not comprise the existing page anchor associated with the search term; and
determine whether the ML document comprises an existing page anchor associated with another portion of content proximate to a location associated with the search term within the ML document.

23. The computer program product of claim 17, where, in causing the computer to identify the location of the search term within the ML document, the computer readable program when executed on the computer causes the computer to:
identify a plurality of locations of the search term within the ML document;
determine a preferred location for the search term from the plurality of locations of the search term within the ML document; and
select the preferred location for the search term as the identified location.

24. The computer program product of claim 17, where the searching/indexing device is distributed across a plurality of devices.

* * * * *